United States Patent
Ku et al.

(10) Patent No.: US 7,339,485 B2
(45) Date of Patent: Mar. 4, 2008

(54) RECTIFIER FOR SUPPLYING DOUBLE VOLTAGE AND RFID TAG THEREOF

(75) Inventors: Ja-nam Ku, Yongin-si (KR);
Young-hoon Min, Anyang-si (KR);
Il-jong Song, Suwon-si (KR);
Dong-hyun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 11/356,023

(22) Filed: Feb. 17, 2006

(65) Prior Publication Data

US 2006/0187062 A1   Aug. 24, 2006

(30) Foreign Application Priority Data

Feb. 18, 2005   (KR) .................. 10-2005-0013538

(51) Int. Cl.
*G08B 21/00* (2006.01)
*H04Q 13/14* (2006.01)
*H04Q 7/00* (2006.01)

(52) U.S. Cl. .......... 340/636.2; 340/645; 340/662; 340/572.1; 340/539.1; 363/125; 363/126

(58) Field of Classification Search .............. None
See application file for complete search history.

(56) References Cited

U.S. PATENT DOCUMENTS

| 5,200,887 A | * | 4/1993 | Ioroi et al. ............ 363/143 |
| 5,541,495 A | * | 7/1996 | Gali ..................... 320/165 |
| 6,950,767 B2 | * | 9/2005 | Yamashita et al. ...... 702/81 |
| 2007/0115704 A1 | * | 5/2007 | Ito ...................... 363/125 |

FOREIGN PATENT DOCUMENTS

| KR | 2000-0183709 Y1 | 6/2000 |
| KR | 2003-0073587 A | 9/2003 |

* cited by examiner

*Primary Examiner*—Julie Bichngoc Lieu
(74) *Attorney, Agent, or Firm*—Sughrue Mion, PLLC

(57) ABSTRACT

Disclosed is a rectifier for supplying double voltage and an RFID tag thereof. The rectifier includes a charging part for charging an input voltage induced to input ends by a received radio frequency (RF) signal; a power provider for charging a sum voltage corresponding to the sum of the input voltage induced to the input end and the voltage charged in the charging part as a power voltage, and discharging the charged power voltage to provide a direct current (DC) power; and a switching part for switching to supply the input voltage induced at the input ends to the charging part during a first interval and switching to supply the sum voltage to the power provider during a second interval. Accordingly, double voltage can be supplied to other electric elements formed in the RFID tag and overcurrent caused by overvoltage can be prevented from flowing into the elements.

10 Claims, 2 Drawing Sheets

RECTIFIER FOR SUPPLYING DOUBLE VOLTAGE AND RFID TAG THEREOF

CROSS-REFERENCE TO RELATED APPLICATIONS

This application claims priority from Korean Patent Application No. 10-2005-0013538, filed Feb. 18, 2005, the entire content of which are incorporated herein by reference.

BACKGROUND OF THE INVENTION

1. Field of the Invention

The present invention relates to a rectifier and an RFID tag thereof. More particularly, the present invention relates to a rectifier for supplying double voltage and an RFID tag thereof.

2. Description of the Related Art

With the recent advancements in the field of radio technology, a diverse range of applications of the radio frequency identification (RFID) system from a prepaid bus card and parking lot pass to a lab pass have been developed.

The RFID system consists of an RFID reader and a RFID tag, and the RFID tag can be manufactured in a card, sticker or the like, according to user convenience and usage. Basically, the RFID process is performed by exchanging an RF (radio frequency) signal between the RFID reader and RFID tag. That is, after the information for authentication which is stored in a memory formed in the RFID tag is output in the form of the RF signal, the RFID reader receives and identifies the signal.

The RFID tag replenishes necessary power using the RF signal received from the RFID reader. Meanwhile, as the power induced by the RF signal is an alternating current (AC) power, a rectifier converting the AC power into a direct current (DC) power has to be formed in the RFID tag.

The rectifier formed in the RFID tag has to meet the following.

First of all, when the RF signal received in the RFID tag is weak so that the induced AC power is weak, the rectifier has to be able to supply comparatively strong DC power to other electric elements formed in the RFID tag.

Additionally, when the RFID tag closely approach the RFID reader and a strong RF signal is received so that the induced AC power is strong, the rectifier has to take action not to damage the elements formed in the RFID tag.

Furthermore, the rectifier has to be able to supply a superior driving clock to elements in need of a driving clock.

SUMMARY OF THE INVENTION

It is an aspect of the present invention to provide a rectifier for supplying double voltage, prevent overcurrent caused by overvoltage from flowing into the elements, and provide a superior driving clock and an RFID tag thereof.

The present invention provides a rectifier comprising a charging part for charging an input voltage induced to an input end by a received radio frequency (RF) signal, a power provider for charging a sum voltage corresponding to the sum of the input voltage induced to the input end and the voltage charged in the charging part as a power voltage, and discharging the charged power voltage to provide a direct current (DC) power to an outer electric element, and a switching part for switching to supply the input voltage induced to the input end to the charging part during a first interval and switching to supply the sum voltage to the power provider during a second interval.

Further, the charging part may comprise a first capacitor whose one end is connected to one of input terminals comprising the input ends and another end is connected to the switching part. The power provider may comprise a second capacitor whose one end is connected to the switching part and a power output terminal and another end is grounded.

Additionally, the switching part may comprise a first Schottky diode whose one end is connected to another terminal of the input terminals and another end is connected to the charging part, and a second Schottky diode whose one end is connected to the charging part and the another end of the first Schottky diode, and another end of the second Schottky diode is connected to the power provider and the power output terminal.

Further, the rectifier may further comprise a first protector for switching not to supply the input voltage to the charging part, if the input voltage induced to the input end exceeds a certain level, and a second protector for switching not to supply the input voltage to the switching part, if the input voltage induced to the input end exceeds the certain level.

Further, the first protector may comprise a fourth Schottky diode whose one end is grounded, and another end is connected to one of the input terminals constructing the input ends and the charging part, and the second protector may comprise a fifth Schottky diode whose one end is grounded, and another end is connected to another one of the input terminals constructing the input ends and the switching part.

Further, the rectifier may further comprise a driving clock provider for generating a driving clock using the sum voltage and providing the generated driving clock to the outer electric element, and wherein the switching part switches to supply the sum voltage to the power provider and the driving clock provider during the second interval.

Further, the driving clock provider may comprise a third capacitor whose one end is connected to the switching part and a driving clock output terminal and another end is grounded. The switching part may comprise the first Schottky diode whose one end is connected to another terminal of the input terminals, and another end of the first Schottky diode is connected to the charging part, the second Schottky diode whose one end is connected to the charging part and the another end of the first Schottky diode, and another end of the second Schottky diode is connected to the power provider and the power output terminal, and a third Schottky diode whose one end is connected to the charging part, the another end of the first Schottky diode and the one end of the second Schottky diode, and another end of the third Schottky diode is connected to the driving clock provider.

Meanwhile, a RFID tag transmitting and receiving an RF signal to and from an RFID reader comprises a charging part for charging an input voltage induced to an input end by an RF signal received from the RFID reader, a power provider for charging a sum voltage corresponding to the sum of the input voltage induced to the input end and the voltage charged in the charging part as a power voltage, and discharging the charged power voltage to provide a direct current (DC) power to an outer electric element, and a switching part for switching to supply the input voltage induced to the input end to the charging part during a first interval and switching to supply the sum voltage to the power provider during a second interval.

Further, the RFID tag may further comprise a first protector for switching not to supply the input voltage to the charging part, if the input voltage induced to the input end exceeds a certain level, and a second protector for switching not to supply the input voltage to the switching part, if the input voltage induced to the input end exceeds the certain level.

Further, the RFID tag may further comprise a driving clock provider for generating a driving clock using the sum voltage and providing the generated driving clock to the outer electric element, and wherein the switching part switches to supply the sum voltage to the power provider and the driving clock provider during the second interval.

BRIEF DESCRIPTION OF THE DRAWING FIGURES

The above and/or other aspects of the present invention will become more apparent by describing certain exemplary embodiments of the present invention with reference to the attached drawing figures, wherein.

DETAILED DESCRIPTION OF THE EXEMPLARY EMBODIMENTS

Figure 1:
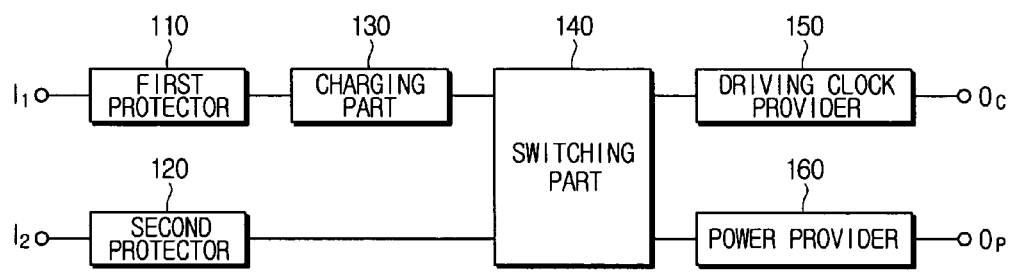
FIG. 1 is a block diagram showing a rectifier for supplying double voltage according to an exemplary embodiment of the present invention.

Hereinafter, an exemplary embodiment of the present invention will be described in detail with reference to the accompanying drawing figures.

In the following description, same drawing reference numerals are used for the same elements even in different drawings. The matters defined herein are described at a high-level of abstraction to provide a comprehensive yet clear understanding of the invention. It is also to be noted that it will be apparent to those ordinarily skilled in the art that the present invention is not limited to the description of the exemplary embodiments provided herein.

FIG. 1 is a block diagram of a rectifier according to an exemplary embodiment of the present invention. The rectifier is formed in a radio frequency identification (RFID) tag and provides a DC power to other electric elements in the RFID tag. Upon providing the power, the rectifier can supply double voltage of an input power induced by an RF signal received from the RFID reader.

Additionally, when overvoltage is induced as the input voltage, the rectifier can prevent overcurrent caused by the overvoltage from flowing into the elements. Moreover, the rectifier can generate a superior driving clock using double voltage.

Referring to FIG. 1, the rectifier comprises a first protector 110, a second protector 120, a charging part 130, a switching part 140, a driving clock provider 150 and a power provider 160. Input voltage is induced in the input ends $I_1$, $I_2$ of the rectifier by an RF signal received from the RFID reader. Driving clock is output through a driving clock output terminal $O_c$ and DC power is output through a power output terminal $O_p$. The output driving clock and DC power are supplied to different electric elements, respectively.

When overvoltage is induced at the input ends $I_1$, $I_2$, the first protector 110 switches in order for the overvoltage not to be supplied to the charging part 130. Additionally, when overvoltage is induced to the input ends $I_1$, $I_2$, the second protector 110 switches in order for the overvoltage not to be supplied to the switching part 140.

When overvoltage is induced as an input voltage, the first protector 110 and second protector 120 prevents overcurrent caused by the overvoltage from flowing into different elements so that the different elements can be protected.

The charging part 130 charges the input voltage induced to the input ends $I_1$, $I_2$ and provides the charged voltage to the driving clock provider 150 and power provider 160 through the switching part 140.

The driving clock provider 150 generates a driving clock using a voltage corresponding to the sum of the input voltages induced at the input ends $I_1$, $I_2$ and the voltage charged in the charging part 130. It is to be noted that such voltage corresponding to the sum of input voltages along with the charged voltage is referred to as the sum voltage. If the charged voltage of the charging part 130 is the same as the input voltages, the voltage of the driving clock is twice as much as the input voltage. The driving clock provider 150 provides the generated driving clock to external electric elements through the driving clock output terminal $O_c$.

The power provider 160 provides the sum voltage as a power voltage. The power provider 160 discharges the power voltage and provides DC power to the external electric elements through the power output terminal $O_p$.

The switching part 140 switches in order for the input voltage to be supplied to the charging part 130 during a 'first interval' and switches in order for the sum voltage to be supplied to the driving clock provider 150 and the power provider 160 during a 'second interval'. The 'first interval' refers to an instance where negative(−) input voltage is induced at the input ends $I_1$, $I_2$ and the 'second interval' refers to an instance where positive(+) input voltage is induced at the input ends $I_1$, $I_2$.

Figure 2:
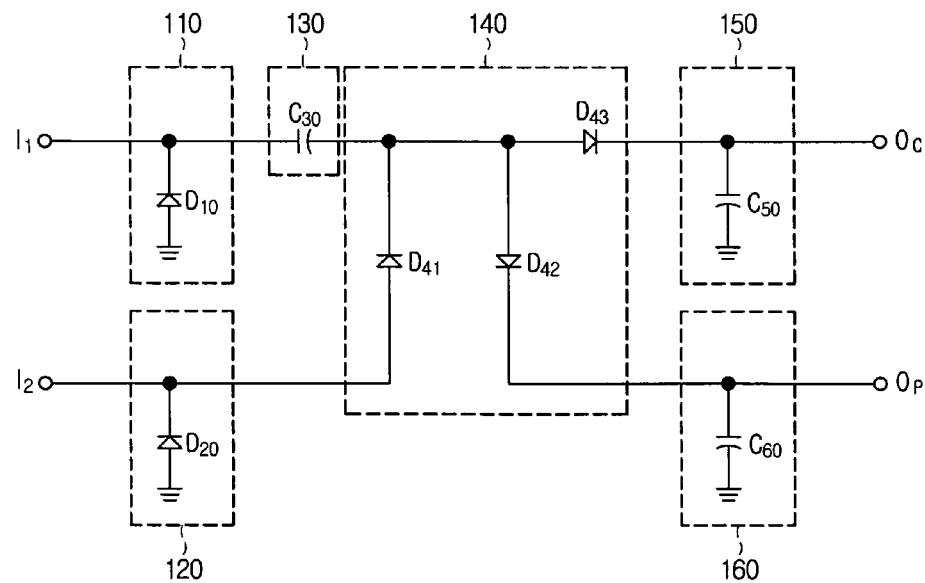
FIG. 2 is a circuit diagram of the rectifier shown in FIG. 1.

Hereinbelow, a circuit structure of a rectifier according to an exemplary embodiment of the present invention will be described in detail with reference to FIG. 2. FIG. 2 is a circuit diagram of the rectifier shown in FIG. 1.

Referring to FIG. 2, the first protector 110 includes a Schottky diode $D_{10}$ whose one end is grounded, and another end is connected to the first input terminal $I_1$ and $C_{30}$. In addition, the second protector 120 includes a Schottky diode $D_{20}$ whose one end is grounded, and another end is connected to the second input terminal $I_2$ and $D_{41}$.

The charging part 130 includes a capacitor $C_{30}$ whose one end is connected to $I_1$ and $D_{10}$ and another end is connected to $D_{41}$.

The switching part 140 includes three Schottky diodes $D_{41}$, $D_{42}$ and $D_{43}$. One end of $D_{41}$ is connected to $I_2$ and $D_{20}$, and another end is connected to $C_{30}$, $D_{42}$ and $D_{43}$. One end of $D_{42}$ is connected to $C_{30}$, $D_{41}$ and $D_{43}$, and another end is connected to $C_{60}$ and $O_p$. One end of $D_{43}$ is connected to $C_{30}$, $D_{41}$ and $D_{42}$, and another end is connected to $C_{50}$ and $O_c$.

The driving clock provider 150 includes a capacitor $C_{50}$ whose one end is connected to $D_{43}$ and $O_c$ and another end is grounded. The power provider 160 includes a capacitor $C_{60}$ whose one end is connected to $D_{42}$ and $O_p$ and another end is grounded.

Figure 3:
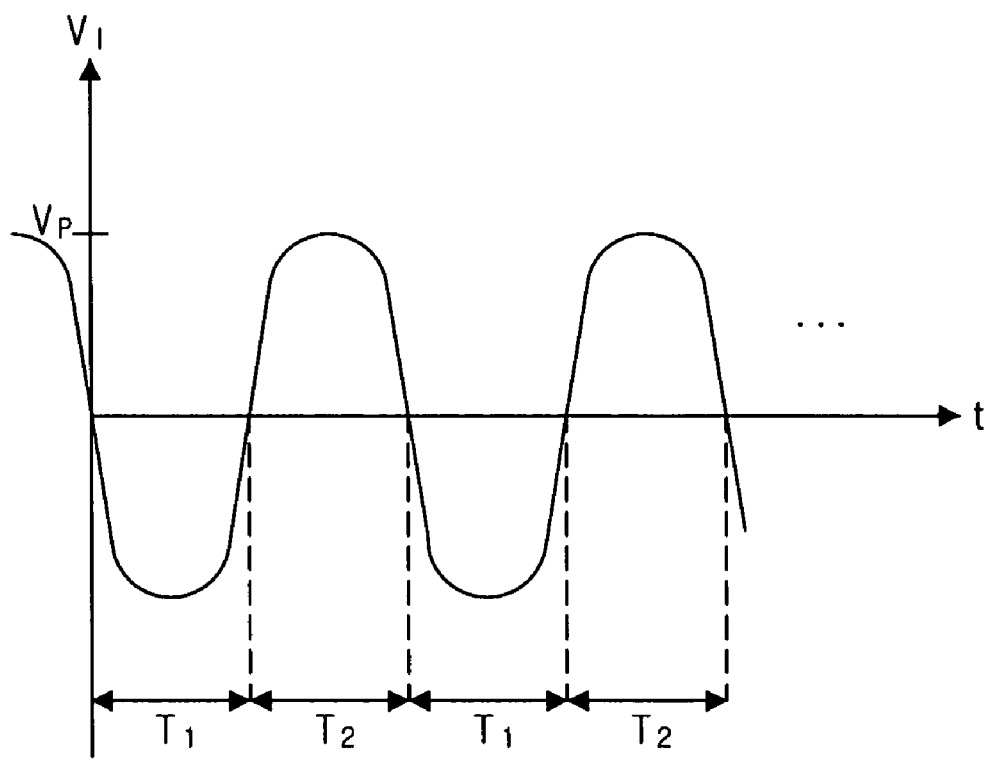
FIG. 3 is a graph showing the input voltage induced at the input ends of the exemplary embodiment of the rectifier of the present invention.

Herein below, a circuit operation of the rectifier will be described in detail with reference to FIG. 2. It is assumed that input voltage of alternating current as shown in FIG. 3 is induced to the input ends $I_1$, $I_2$.

First of all, during the first interval $T_1$ when negative (−) input voltage $V_I$ is induced, $D_{41}$ is 'ON' so that $C_{30}$ is charged with $V_p$.

Meanwhile, during the second interval $T_2$ when positive (+) input voltage $V_I$ is induced, $D_{41}$ is 'OFF', and $D_{42}$ and $D_{43}$ are 'ON'. Accordingly, the sum voltage (the input voltage ($V_p$)+the charged voltage of $C_{30}$ ($V_p$)=$2V_p$) is provided to $C_{50}$ and $C_{60}$. As a result, $C_{50}$ is charged with $2V_p$ and $C_{60}$ is charged with $2V_p$.

Again, during the first interval $T_1$ when negative (−) input voltage $V_I$ is induced, $D_{41}$ is 'ON' so that $C_{30}$ is charged with $V_p$. At this time, $C_{50}$ discharges the charged $2V_p$ and also $C_{60}$ discharges the charged $2V_p$.

If $C_{50}$ repeats to charge and discharge $2V_p$, $O_c$ outputs a driving clock and voltage of the driving clock is $2V_p$. As voltage of the driving clock $2V_p$ is twice as much as the input voltage $V_p$, damage of the driving clock by noise can be reduced.

Meanwhile, $C_{60}$ may be a capacitor with bigger capacitance than $C_{50}$. This is because when $C_{60}$ repeats to charge and discharge $2V_p$, $O_p$ outputs DC power. Voltage of the output DC power is $2V_p$. Accordingly, voltage of the DC power that the rectifier provides becomes twice as much as the input voltage $V_p$ induced in the rectifier.

If high positive (+) input voltage $V_I$ is induced to the input ends $I_1$, $I_2$, overcurrent generated by the voltage flows to the grounding end through $D_{10}$. Moreover, if high negative (−) input voltage $V_I$ is induced to the input ends $I_1$, $I_2$, overcurrent generated by the voltage flows to the grounding end through $D_{20}$. That is, $D_{10}$ and $D_{20}$ perform a protecting function of electrostatic discharge (ESD).

As can be appreciated from the above description, when an RF signal received in an RFID tag is weak so that the induced AC power is weak, comparatively strong DC power can be provided to other electric elements formed in the RFID tag according to the present invention.

Additionally, when the RFID tag is close to the RFID reader so that a strong RF signal is received and the induced AC power is strong, elements formed in the RFID tag can be protected from the flow of any overcurrent generated.

Moreover, a superior driving clock can be provided to the elements requiring the driving clock of the elements formed in the RFID tag.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A rectifier, comprising:
a charging part which charges an input voltage induced at input ends by receiving a radio frequency (RF) signal;
a power provider which charges a sum voltage corresponding to a sum of the input voltage induced at the input ends and a voltage charged in the charging part as a power voltage, and discharges the charged power voltage to provide a direct current (DC) power to an outer electric element; and
a switching part which switches to supply the input voltage induced at the input ends to the charging part during a first interval, and switches to supply the sum voltage to the power provider during a second interval.

2. The rectifier of claim 1, wherein the charging part comprises a first capacitor whose one end is connected to a first end of the input ends and another end is connected to the switching part, and
the power provider comprises a second capacitor whose one end is connected to the switching part and a power output terminal and another end is grounded.

3. The rectifier of claim 2, wherein the switching part comprises:

a first Schottky diode whose one end is connected to a second end of the input ends and another end is connected to the charging part; and
a second Schottky diode whose one end is connected to the charging part and the another end of the first Schottky diode, and another end of the second Schottky diode is connected to the power provider and the power output terminal.

4. The rectifier of claim 1, further comprising:
a first protector which switches not to supply the input voltage to the charging part, if the input voltage induced at the input ends exceeds a first certain level; and
a second protector which switches not to supply the input voltage to the switching part, if the input voltage induced at the input ends exceeds a second certain level.

5. The rectifier of claim 4, wherein the first protector comprises a fourth Schottky diode whose one end is grounded, and another end is connected to the first end of the input ends and the charging part; and
the second protector comprises a fifth Schottky diode whose one end is grounded, and another end is connected to the second end of the input ends and the switching part.

6. The rectifier of claim 1, further comprising:
a driving clock provider which generates a driving clock using the sum voltage and provides the generated driving clock to the outer electric element, and
wherein the switching part switches to supply the sum voltage to the power provider and the driving clock provider during the second interval.

7. The rectifier of claim 6, wherein the driving clock provider comprises a third capacitor whose one end is connected to the switching part and a driving clock output terminal, and another end of the third capacitor is grounded; and
the switching part comprises a first Schottky diode whose one end is connected to a second end of the input ends and another end is connected to the charging part;
a second Schottky diode whose one end is connected to the charging part and the another end of the first Schottky diode, and another end of the second Schottky diode is connected to the power provider and a power output terminal; and
a third Schottky diode whose one end is connected to the charging part, the another end of the first Schottky diode and the one end of the second Schottky diode, and another end of the third Schottky diode is connected to the driving clock provider.

8. A radio frequency identification (RFID) tag transmitting and receiving an RF signal to and from an RFID reader, comprising:
a charging part which charges an input voltage induced at input ends by an RF signal received from the RFID reader;
a power provider which charges a sum voltage corresponding to a sum of the input voltage induced at the input ends and a voltage charged in the charging part as a power voltage, and discharges the charged power voltage to provide a direct current (DC) power to an outer electric element; and
a switching part which switches to supply the input voltage induced at the input ends to the charging part during a first interval and switching to supply the sum voltage to the power provider during a second interval.

9. The RFID tag of claim 8, further comprising:
a first protector which switches not to supply the input voltage to the charging part, if the input voltage induced at the input ends exceeds a certain level; and
a second protector which switches not to supply the input voltage to the switching part, if the input voltage induced at the input end exceeds the certain level.

10. The RFID tag of claim 8, further comprising a driving clock provider which generates a driving clock using the sum voltage and provides the generated driving clock to the outer electric element,
wherein the switching part switches to supply the sum voltage to the power provider and the driving clock provider during the second interval.

* * * * *